United States Patent
Koga et al.

(10) Patent No.: US 11,047,678 B2
(45) Date of Patent: Jun. 29, 2021

(54) PROBE UNIT AND MEASURING SYSTEM

(71) Applicant: MITUTOYO CORPORATION, Kanagawa (JP)

(72) Inventors: Satoshi Koga, Ibaraki (JP); Akinori Saito, Ibaraki (JP); Hiroyuki Kanamori, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 110 days.

(21) Appl. No.: 16/690,613

(22) Filed: Nov. 21, 2019

(65) Prior Publication Data

US 2020/0166336 A1 May 28, 2020

(30) Foreign Application Priority Data

Nov. 28, 2018 (JP) .............................. JP2018-222917

(51) Int. Cl.
| | |
|---|---|
| *G01B 5/008* | (2006.01) |
| *G01B 21/04* | (2006.01) |
| *G01B 3/20* | (2006.01) |
| *G01B 5/012* | (2006.01) |

(52) U.S. Cl.
CPC ........... *G01B 21/047* (2013.01); *G01B 3/205* (2013.01); *G01B 5/012* (2013.01); *G01B 21/042* (2013.01)

(58) Field of Classification Search
CPC ... G01B 21/042; G01B 21/045; G01B 21/047
USPC .......................................................... 33/503
See application file for complete search history.

(56) References Cited

U.S. PATENT DOCUMENTS

| | | | |
|---|---|---|---|
| 5,228,352 A | 7/1993 | McMurtry et al. | |
| 5,526,576 A * | 6/1996 | Fuchs ................... | G01B 7/012 33/503 |
| 10,415,949 B2 | 9/2019 | Koga et al. | |

(Continued)

FOREIGN PATENT DOCUMENTS

JP 6212148 10/2017

OTHER PUBLICATIONS

Official Communication Issued in European Patent Office Patent Application No. 19211916.2, dated May 4, 2020.

*Primary Examiner* — George B Bennett
(74) *Attorney, Agent, or Firm* — Greenblum & Bernstein, P.L.C.

(57) ABSTRACT

In a probe unit having a measuring probe, a signal processing circuit includes: a signal synthesizing portion configured to process an output of a detection element to output a composite signal obtained by synthesizing displacement components of a contact part in three directions perpendicular to one another; and a signal outputting portion configured to output a digital touch signal to the outside of the probe unit when the composite signal satisfies a predetermined threshold condition. The signal outputting portion includes three comparing portions each configured to compare a threshold condition with the composite signal. When the measuring probe measures the object to be measured, the signal outputting portion outputs the digital touch signal corresponding to outputs of the first and second comparing portions. Thus, there can be provided a probe unit and a measuring system that can stably make measurements with high accuracy while keeping high noise resistance.

12 Claims, 9 Drawing Sheets

(56) References Cited

U.S. PATENT DOCUMENTS

| | | | |
|---|---|---|---|
| 2006/0056548 A1* | 3/2006 | Saito | G01D 18/00 |
| | | | 375/345 |
| 2008/0047335 A1* | 2/2008 | Kawasaki | G01Q 20/02 |
| | | | 73/105 |
| 2008/0065341 A1* | 3/2008 | Ishikawa | G01B 21/045 |
| | | | 702/95 |
| 2012/0084989 A1* | 4/2012 | Pettersson | G01B 21/045 |
| | | | 33/503 |
| 2013/0111773 A1* | 5/2013 | Fuchs | G01B 21/047 |
| | | | 33/503 |
| 2014/0144033 A1 | 5/2014 | Wooldridge et al. | |
| 2016/0018218 A1* | 1/2016 | Nakagawa | G01B 5/008 |
| | | | 33/503 |
| 2017/0138726 A1* | 5/2017 | Roithmeier | G05B 23/0272 |
| 2017/0248402 A1 | 8/2017 | Koga et al. | |
| 2018/0017954 A1* | 1/2018 | Noda | G05B 19/401 |
| 2018/0172416 A1 | 6/2018 | Jansson | |
| 2020/0356068 A1* | 11/2020 | O'Hare | G05B 19/401 |
| 2020/0386579 A1* | 12/2020 | Terashita | G01B 5/008 |
| 2020/0386646 A1* | 12/2020 | Saito | G01B 5/016 |

* cited by examiner

PROBE UNIT AND MEASURING SYSTEM

CROSS-REFERENCE TO RELATED APPLICATION

The disclosure of Japanese Patent Applications No. 2018-22917 filed on Nov. 28, 2018 including specifications, drawings and claims are incorporated herein by reference in its entirety.

TECHNICAL FIELD

The present invention relates to a probe unit and a measuring system, and in particular, to a probe unit and a measuring system that can stably make measurements with high accuracy while keeping high noise resistance.

BACKGROUND ART

A measuring probe as described in Japanese Patent No. 6212148 has been proposed in the conventional technique. This measuring probe includes: a stylus having a contact part to be in contact with an object to be measured; a detection element capable of detecting a movement of the contact part; and a signal processing circuit that processes an output of the detection element. The signal processing circuit processes an analog output of the detection element to output a digital touch signal to the outside. Thus, the digital touch signal outputted from the measuring probe has high noise resistance, with which the digital touch signal is less likely to have noise contamination.

SUMMARY OF INVENTION

Technical Problem

In the measuring probe described in Japanese Patent No. 6212148, however, the digital touch signal is generated on the basis of results determined in accordance with a single threshold. Although such a threshold is determined on the basis of results of preliminary measurements, the measuring probe described in Japanese Patent No. 6212148 has the possibility of producing measurement results such that a too low threshold causes the digital touch signal to be outputted in spite of no contact of the contact part with the object to be measured, or a too high threshold causes the output failure of the digital touch signal in spite of the contact of the contact part with the object to be measured.

The present invention has been made in order to solve the above-described problems in the conventional technique, and an object thereof is to provide a probe unit and a measuring system that can stably make measurements with high accuracy while keeping high noise resistance.

Solution to Problem

To solve the above-described problems, a first aspect of the present invention provides a probe unit having a measuring probe including: a stylus having a contact part to be in contact with an object to be measured; a detection element configured to be capable of detecting a movement of the contact part; and at least part of a signal processing circuit configured to process an output of the detection element to output a digital touch signal. The signal processing circuit processes the output of the detection element to output a composite signal obtained by synthesizing displacement components of the contact part in three directions perpendicular to one another; and outputs the digital touch signal to the outside of the probe unit when the composite signal satisfies a predetermined threshold condition. The signal processing circuit includes a plurality of comparators (comparing portions) each configured to compare at least a part of the predetermined threshold condition with the composite signal. When the measuring probe measures the object to be measured, the signal processing circuit outputs the digital touch signal corresponding to outputs of two or more comparators of the plurality of comparators.

A second aspect of the present invention provides the probe unit in which the signal processing circuit further stores a plurality of other threshold conditions capable of replacing the predetermined threshold condition set in the comparing portion by default.

A third aspect of the present invention provides the probe unit in which the digital touch signal is outputted as parallel digital data.

A fourth aspect of the present invention provides the probe unit in which the digital touch signal is outputted as serial digital data.

A fifth aspect of the present invention provides the probe unit in which the predetermined threshold condition includes a signal level and a duration of the signal level.

A sixth aspect of the present invention provides the probe unit in which the signal level of the predetermined threshold condition is set in each of the two or more comparators, and the durations of the signal levels are set to be the same as each other in the two or more comparators. The signal processing circuit further determines if durations of the outputs of the two or more comparators exceed the durations of the signal levels of the predetermined threshold conditions, respectively, and to output the digital touch signal when the durations of the outputs of the two or more comparators exceed the durations of the signal levels of the predetermined threshold conditions.

A seventh aspect of the present invention provides the probe unit in which, when the measuring probe measures the object to be measured, the signal processing circuit outputs the digital touch signal using two of the predetermined threshold conditions in which the signal levels are different from each other and the duration of the signal level which has a higher level of the signal level is greater than or equal to the duration of the signal level which has a lower level of the signal level.

An eighth aspect of the present invention provides the probe unit in which, when the measuring probe measures the object to be measured, the signal processing circuit outputs the digital touch signal using two of the predetermined threshold conditions in which the signal levels are the same as each other and the durations of the signal levels are different from each other.

A ninth aspect of the present invention provides the probe unit in which, when the measuring probe is just moved without measuring the object to be measured, the signal processing circuit outputs the digital touch signal using the predetermined threshold condition having the signal level higher than the signal levels used when the measuring probe measures the object to be measured.

A tenth aspect of the present invention provides a measuring system including: a measuring probe including a stylus having a contact part to be in contact with an object to be measured, a detection element configured to be capable of detecting a movement of the contact part, and a signal processing circuit configured to process an output of the detection element to output a digital touch signal; and a main body device configured to movably support the measuring probe and obtain a shape of the object to be measured on the basis of an output of the signal processing circuit. The signal processing circuit processes the output of the detection element to output a composite signal obtained by synthesizing displacement components of the contact part in three directions perpendicular to one another; and outputs the digital touch signal to the main body device when the composite signal satisfies a predetermined threshold condition. The signal processing circuit includes a plurality of comparators each configured to compare the predetermined threshold condition with the composite signal. When the measuring probe measures the object to be measured, the signal processing circuit outputs the digital touch signal corresponding to outputs of two or more comparators of the plurality of comparators. The main body device receives the digital touch signal and obtains the shape of the object to be measured when the outputs of the two or more comparators satisfy the predetermined threshold condition.

An eleventh aspect of the present invention provides a measuring system including: a measuring probe including a stylus having a contact part to be in contact with an object to be measured, a detection element configured to be capable of detecting a movement of the contact part, and a signal processing circuit configured to process an output of the detection element to output a digital touch signal; and a main body device configured to movably support the measuring probe and obtain a shape of the object to be measured on the basis of an output of the signal processing circuit. The signal processing circuit processes the output of the detection element to output a composite signal obtained by synthesizing displacement components of the contact part in three directions perpendicular to one another; and outputs the digital touch signal to the main body device when the composite signal satisfies a part of a predetermined threshold condition. The signal processing circuit includes a plurality of comparators each configured to compare the part of the predetermined threshold condition with the composite signal. When the measuring probe measures the object to be measured, the signal processing circuit outputs the digital touch signal corresponding to outputs of two or more comparators of the plurality of comparators. The predetermined threshold condition includes a signal level and a duration of the signal level. The signal level of the predetermined threshold condition is applied in the comparators, and the duration of the signal level is the same in all of the comparators. The main body device applies the duration of the signal level of the predetermined threshold condition to the digital touch signal upon the reception of the digital touch signal, and obtains the shape of the object to be measured when the outputs of the two or more comparators satisfy the predetermined threshold condition.

A twelfth aspect of the present invention provides the measuring system in which the predetermined threshold condition can be replaced by another threshold condition by a rewrite signal outputted from the main body device.

According to the present invention, it is possible to provide the measuring probe and the measuring system capable of stably making measurements with high accuracy while keeping high noise resistance.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will be described below in detail with reference to the drawings.

A measuring system according to a first embodiment of the present invention will be described with reference to FIGS. 1 to 6B.

An overall configuration of a measuring system 100 will be described first.

Figure 1:
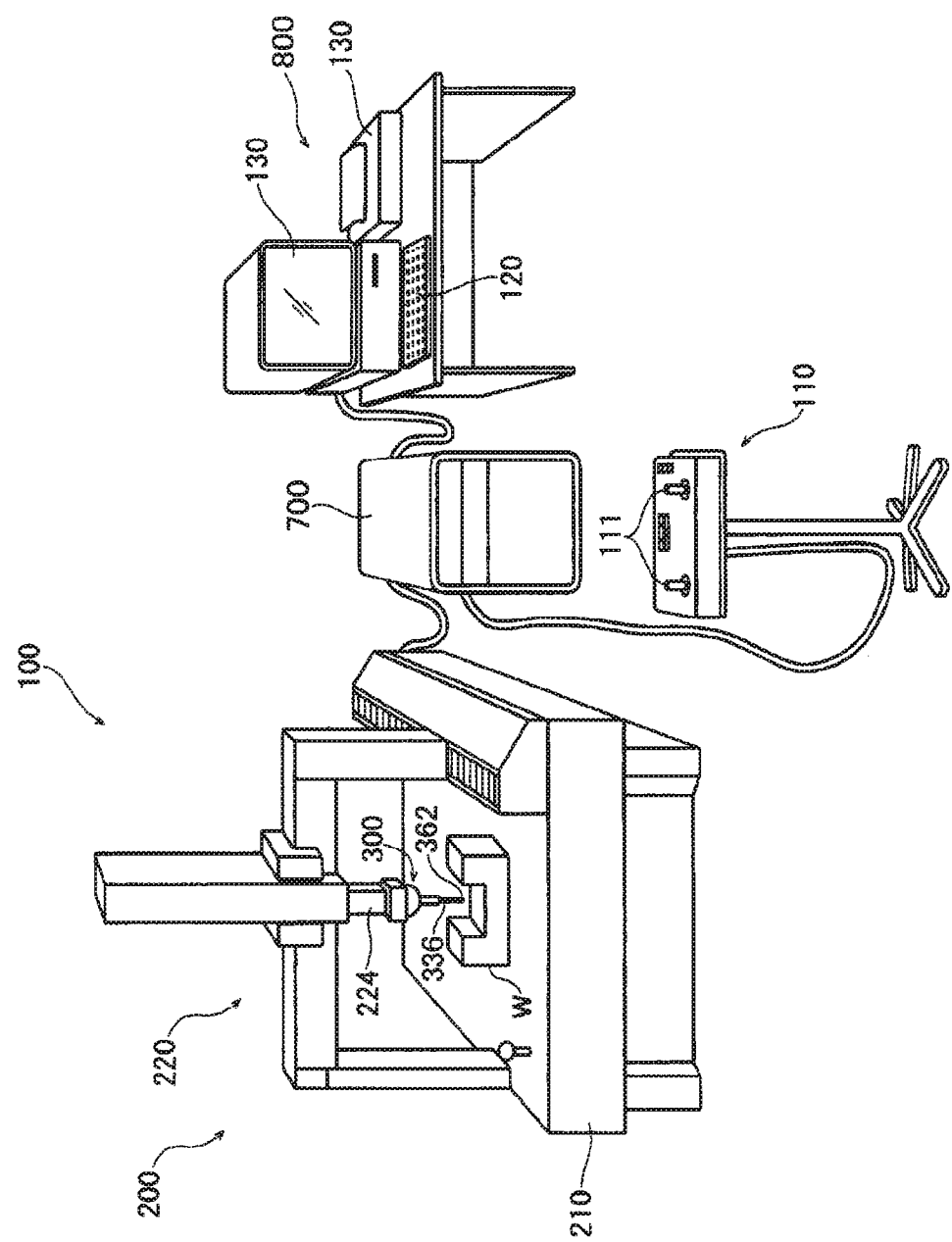
FIG. 1 is a schematic diagram illustrating an example of a measuring system using a measuring probe according to a first embodiment of the present invention.

As illustrated in FIG. 1, the measuring system 100 includes: a coordinate measuring machine 200 configured to move a measuring probe 300; an operation portion 110 having manually-operated joysticks 111; and a motion controller 700 configured to control operations of the coordinate measuring machine 200. The measuring system 100 also includes: a host computer 800 configured to operate the coordinate measuring machine 200 via the motion controller 700 and process measured data acquired by the coordinate measuring machine 200 to obtain, for example, dimensions or a shape of an object W to be measured; an input unit 120 configured to input measurement conditions and the like; and an output unit 130 configured to output measurement results and the like.

As illustrated in FIG. 1, the coordinate measuring machine 200 in the present embodiment includes: the measuring probe 300; a surface plate 210; a drive mechanism 220 which is provided to stand on the surface plate 210 and configured to move the measuring probe 300 three-dimensionally; and a drive sensor (not illustrated) configured to detect a drive amount of the drive mechanism 220. Note that a part of the measuring system 100 excluding the measuring probe 300 is referred to also as a main body device 101.

A general configuration of the measuring probe 300 will next be described.

Figure 2:
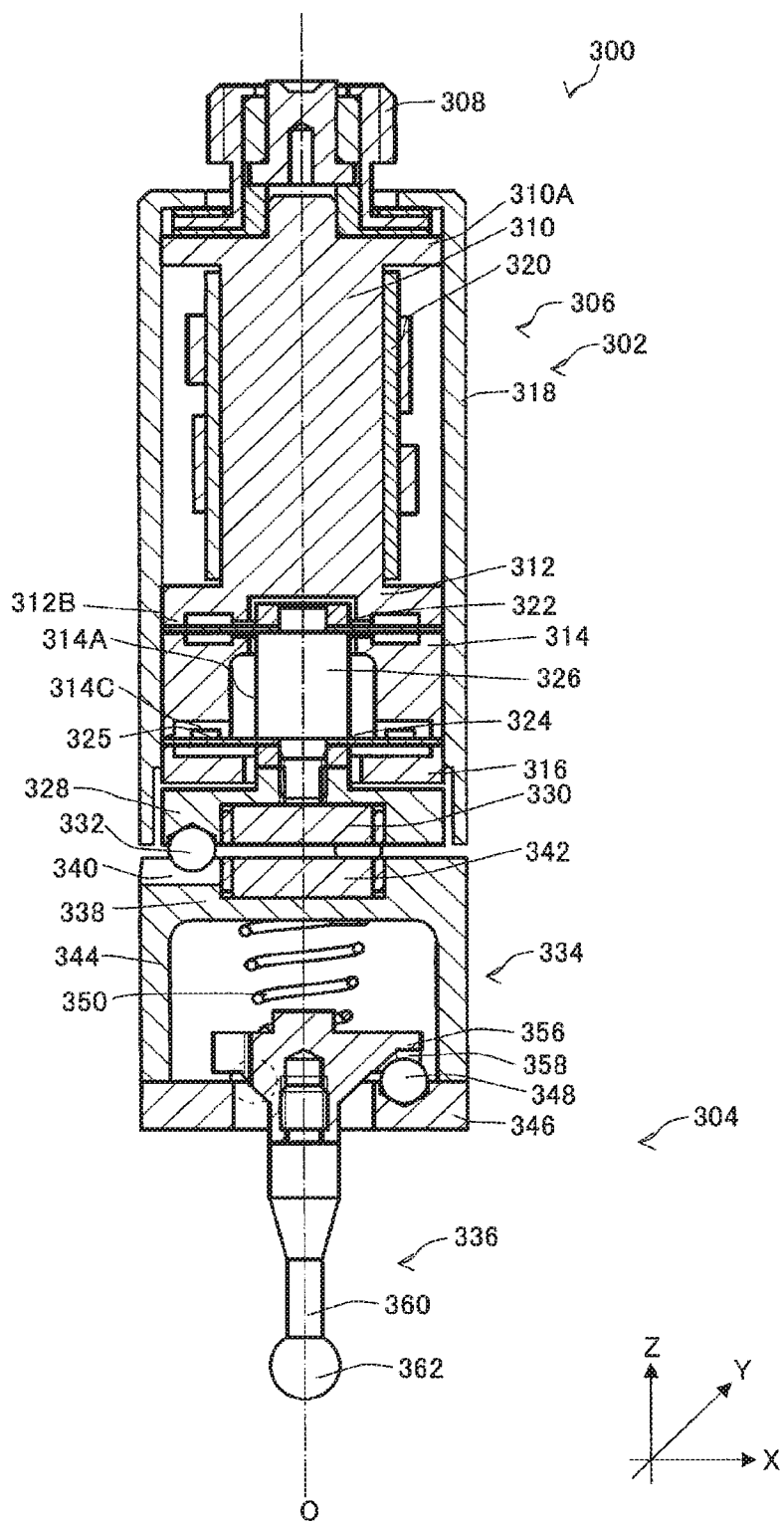
FIG. 2 is a schematic diagram illustrating a cross-section of the measuring probe of FIG. 1.

As illustrated in FIG. 2, the measuring probe 300 includes: a stylus 336 having a contact part 362 to be in contact with the object W to be measured; a probe housing 306 configured to be capable of supporting the stylus 336 on an axial center O; detection elements 325 configured to be capable of detecting movements of the contact part 362 deviating from the axial center O and on the axial center O; and a signal processing circuit 320 configured to process outputs of the detection elements 325 to output a digital touch signal CP. Specifically, the measuring probe 300 is configured as a touch signal probe. Note that the stylus 336 is included in a stylus module 304, and the probe housing 306 and the detection elements 325 are included in a probe main body 302. The probe main body 302 is supported by a spindle 224 of the drive mechanism 220. The stylus module 304 is detachably coupled to the probe main body 302 with high positional reproducibility via a kinematic joint (which will be described later).

The measuring probe 300 will be described below in detail. For the purpose of the following description, the horizontal direction on the plane of paper in FIG. 2 is defined as an X-direction; the vertical direction to the plane of the paper is defined as a Y-direction; and the longitudinal direction on the plane of paper is defined as a Z-direction. Thus, the direction of the axial center O (axial direction O) in the measuring probe 300 coincides with the Z direction. Note that the measuring probe 300 is identical with a probe unit 301 in the present embodiment.

As illustrated in FIG. 2, the probe main body 302 includes the probe housing 306, the signal processing circuit 320, supporting members 322 and 324, the detection elements 325, a coupling shaft 326, a flange member 328, a permanent magnet 330, and balls 332.

As illustrated in FIG. 2, the probe housing 306 includes an attachment part 308, a circuit placement part 310, a fixing member 314, a bottom member 316, and a main body cover 318.

As illustrated in FIG. 2, the attachment part 308 is a part to be attached to the spindle 224 at the upper end of the measuring probe 300. The attachment part 308 is provided with, for example, a head to be inserted into a fitting part provided in the spindle 224. Note that a cable and a connector for electrical connection may be used separately from the attachment part. The attachment part 308 serves also as one of connection terminals configured to be capable of electrically connecting to the motion controller 700. The circuit placement part 310 is disposed at a lower end of the attachment part 308. A cross-section of the circuit placement part 310 perpendicular to the axial center O has a generally triangular shape except for a disc-shaped upper end part 310A and a disc-shaped lower flange 312 provided at a lower end of the circuit placement part 310. The signal processing circuit 320 is disposed around the generally triangular shape. The circuit placement part 310 is disposed above the supporting members 322 and 324.

As illustrated in FIG. 2, the fixing member 314 is fixed to a lower end peripheral part 312B of the lower flange 312 with the supporting member 322 interposed therebetween. The fixing member 314 has a cylindrical shape provided with an opening 314A on the axial center O. A lower end inner surface of the fixing member 314 is provided with four depressed parts 314C with fourfold symmetry. The bottom member 316 is fixed to a lower end peripheral part of the fixing member 314 with the supporting member 324 interposed therebetween. The bottom member 316 has an annular shape. The main body cover 318 has a cylindrical shape and disposed around the circuit placement part 310, the lower flange 312, the fixing member 314 and the bottom member 316 in such a manner as to cover all of the signal processing circuit 320. The main body cover 318 is fixed to the fixing member 314 via bolts.

Figure 3:
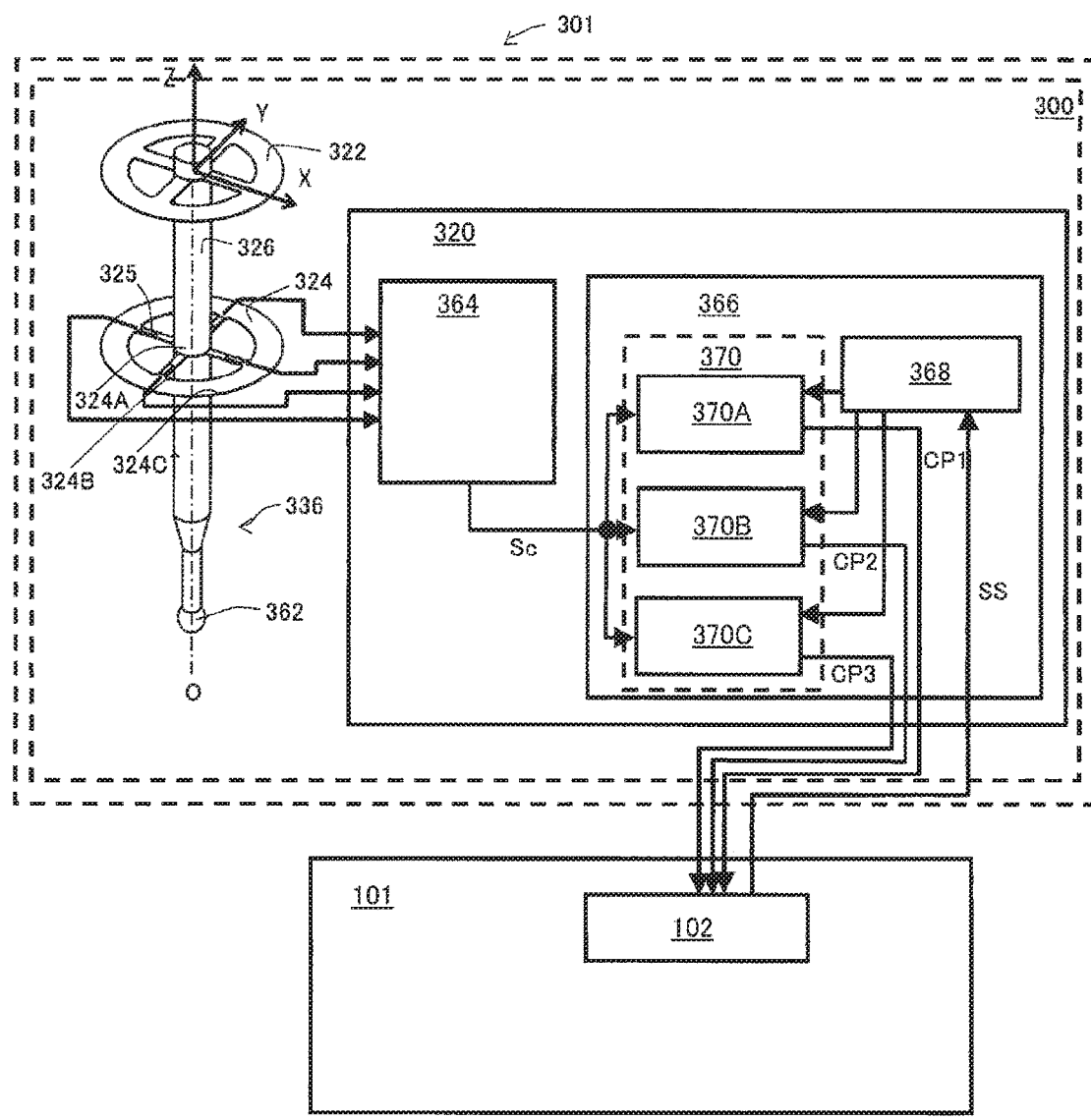
FIG. 3 is a block diagram illustrating a configuration of parts of the measuring probe of FIG. 2 and a main body device.

As illustrated in FIG. 3, the signal processing circuit 320 is a circuit configured to process outputs of the detection elements 325 to output the digital touch signal (contact sensing signal) CP for notifying that the contact part 362 is in contact with the object W to be measured. In brief, the signal processing circuit 320 is configured to obtain deflection amounts in the three X-, Y-, and Z-directions on the basis of outputs of the four detection elements 325, synthesize the deflection amounts in the three directions, and output the digital touch signal CP when the contact part 362 produces a given displacement or more. The specific configuration thereof will be described later.

As illustrated in FIG. 2, the supporting members 322 and 324 are elastically-deformable members disposed in the axial direction O of the probe housing 306 and allowing for orientation changes of the stylus 336. The supporting members 322 and 324 may be formed of, for example, a SST material, but other materials may be employed. Specifically, the supporting member 324 has a rotationally symmetric shape including a total of four deformable arm parts 324B at positions displaced from each other by an angle of 90 degrees in a circumferential direction (around the axial center O) as illustrated in FIG. 3. These four arm parts 324B are formed on the same plane. The supporting members 322 and 324 have the same thickness and the same structure except for the widths of the respective arm parts 324B. Without being limited thereto, the thicknesses, lengths, and shapes of their arm parts 324B may be different from each other, or the entire supporting members 322 and 324 may have shapes different from each other. Thus, the supporting member 324 in which the detection elements 325 are disposed will be described below, and any overlapping description on the supporting member 322 will be omitted. Note that the structure of the supporting members is not limited to the shape shown in the present embodiment.

As illustrated in FIG. 3, the supporting member 324 has a generally circular plate shape, including, in addition to the rectangular arm parts 324B, a central part 324A connected to the coupling shaft 326, and a peripheral part 324C that is coupled to the central part 324A by the arm parts 324B and that is connected to the probe housing 306. The peripheral part 324C is at the outermost position of the supporting member 324, and the arm parts 324B are disposed on an inner side of the peripheral part 324C in such a manner as to extend linearly in a radial direction. The central part 324A is disposed on an inner side of the arm parts 324B. The supporting member 324 is configured so that a displacement of the coupling shaft 326 with respect to the probe housing 306 causes the central part 324A to move up, down, left, or right and thereby causes the arm parts 324B to be elastically deformed.

The detection element 325 is, for example, a strain gauge to be affixed and detects a strain of the supporting member 324 in which the detection elements 325 are disposed as illustrated in FIG. 3. The detection elements 325 are disposed in the arm parts 324B of the supporting member 324 and fixed with an adhesive, for example.

As illustrated in FIGS. 2 and 3, the coupling shaft 326 has a generally cylindrical shape, and is coupled to the two supporting members 322 and 324. The coupling shaft 326 is held on the axial center O by the two supporting members 322 and 324 without being in contact with the lower flange 312, the fixing member 314, and the bottom member 316. The coupling shaft 326 integrally supports the flange member 328.

As illustrated in FIG. 2, the flange member 328 has a generally disc shape. The flange member 328 faces the bottom member 316 in the axial direction O in a non-contact manner and faces the main body cover 318 in the radial direction in a non-contact manner. The flange member 328 supports the stylus module 304. At least a part of a gap between the bottom member 316 and the flange member 328 is filled with a viscous material such as a grease oil. This enables at least the viscous material to damp a displacement of the flange member 328 with respect to the bottom member 316, thereby reducing the occurrence of unwanted vibrations in an X-Y direction and the Z direction, which result from a movement of the measuring probe 300, and preventing an increase in noise, which is accompanied by an increase in the sensitivity of the measuring probe 300. The permanent magnet 330 is fixed, on the axial center O, to a lower surface of the flange member 328. The three balls 332 are disposed with rotational symmetry at an interval of 120 degrees in the circumferential direction in such a manner as to surround the permanent magnet 330 in a lower end outer region of the flange member 328.

As illustrated in FIG. 2, the stylus module 304 includes an over-travel mechanism 334, and the stylus 336 supported by the over-travel mechanism 334.

As illustrated in FIG. 2, the over-travel mechanism 334 is a mechanism that changes the position of the stylus 336 when a large force greater than a measuring force F in outputting the digital touch signal CP is applied to the stylus 336 and automatically restores the position of the stylus 336 when the large force disappears. That is, when such a large force is applied to the stylus 336, the over-travel mechanism 334 functions to change the position of the stylus 336 before the stylus module 304 comes off from the probe main body 302. Specifically, the over-travel mechanism 334 includes a flange part 338, an extended part 344, a stylus holder 346, and a coil spring 350.

As illustrated in FIG. 2, the flange part 338 is a member corresponding to the flange member 328. That is, three V-grooves 340 are disposed at an interval of 120 degrees in the circumferential direction of the flange part 338 in such a manner as to be in contact with the balls 332. A magnetic member (a permanent magnet, for example) 342 attracted to the permanent magnet 330 is disposed in the flange part 338 in such a manner as to face the permanent magnet 330.

As illustrated in FIG. 2, each V-groove 340 is in contact with the surface of a corresponding one of the balls 332. Thus, when the permanent magnet 330 and the magnetic member 342 are attracted to each other with a predetermined magnetic force, the flange part 338 is seated on (in contact with) the flange member 328 at six points. That is, the flange member 328 and the flange part 338 can be coupled to each other while achieving high positioning accuracy. More specifically, the flange part 338 and the flange member 328 constitute a kinematic joint, which is a detachable coupling mechanism. Such a kinematic joint allows for high positioning reproducibility even when the probe main body 302 and the stylus module 304 are repeatedly detached from, and attached to, each other.

As illustrated in FIG. 2, the extended part 344 is integrally formed with a periphery of the flange part 338 and houses the coil spring 350 expandable in the axial direction θ. The stylus holder 346 is provided at an end of the extended part 344 in the axial direction O and connected to the extended part 344 via bolts. The stylus holder 346 movably supports, at its upper surface closer to the coil spring 350, a flange part 356 of the stylus 336 pressed by the coil spring 350. Three balls 348 are disposed on the upper surface of the stylus holder 346 closer to the coil spring 350 at an interval of 120 degrees in the circumferential direction. Three V-grooves 358 are provided on a lower surface of the flange part 356 at an interval of 120 degrees in the circumferential direction in such a manner as to correspond to the balls 348. Note that the axial direction of the V-groove 358 is identical with a generally radial direction heading to the axial center O. That is, it can be said that the stylus holder 346 and the flange part 356 constitute the aforementioned kinematic joint.

Thus, when the flange part 356 is being pressed by the coil spring 350 with a predetermined spring force, the flange part 356 is seated on (in contact with) the stylus holder 346 at six points, thus being positioned at a fixed position. That is, the over-travel mechanism 334 can achieve high positioning reproducibility of the stylus 336 with respect to the flange part 338 within the range of the measuring force F not exceeding the pressing force of the coil spring 350. If a large force greater than the predetermined spring force given by the coil spring 350 is applied to the stylus 336, the flange part 356 is off from the stylus holder 346, thus preventing the stylus module 304 from dropping off from the probe main body 302.

As illustrated in FIG. 2, the stylus 336 includes: the flange part 356 supported by the stylus holder 346 as described above; a rod part 360 configured to extend from the flange part 356 in the axial direction O; and the contact part 362 provided at the tip of the rod part 360.

As illustrated in FIG. 2, the base end of the rod part 360 is attached to the flange part 356. The spherical contact part 362 to be in contact with the object W to be measured is provided at the tip of the rod part 360, i.e., the stylus 336 has the contact part 362 to be in contact with the object W to be measured. Note that the central axis direction of the stylus 336 coincides with the Z-direction (the axial direction O) when the stylus 336 has no displacement in the X-Y direction.

The signal processing circuit 320 and a part of the main body device 101 will be described next mainly with reference to FIGS. 3 to 6B.

As illustrated in FIG. 3, the signal processing circuit 320 includes a signal synthesizing portion 364, and a signal outputting portion 366.

As illustrated in FIG. 3, the signal synthesizing portion 364 processes the outputs of the detection elements 325 to output a composite signal Sc obtained by synthesizing displacement components of the contact part 362 in the three X-, Y-, and Z-directions perpendicular to one another.

As illustrated in FIG. 3, the signal outputting portion 366 outputs the digital touch signal CP to the outside of the measuring probe 300, i.e., the main body device 101 when the composite signal Sc satisfies a predetermined threshold condition (or a threshold condition). Specifically, the signal outputting portion 366, as illustrated in FIG. 3, includes: a condition storing portion 368 configured to store five predetermined threshold conditions (any plural number of threshold conditions may be stored); and three comparing portions (comparators) 370 (a first comparing portion 370A, a second comparing portion 370B, and a third comparing portion 370C) each configured to compare a predetermined threshold condition with the composite signal Sc (any plural number of comparing portions may be employed). When the measuring probe 300 measures the object W to be measured, the signal outputting portion 366 outputs the digital touch signals CP corresponding to the outputs of at least two (the comparing portions 370A and 370B) of the three comparing portions 370. When the measuring probe 300 measures the object W to be measured, the digital touch signals CP in the present embodiment are an output CP1 of the first comparing portion 370A and an output CP2 of the second comparing portion 370B. When the measuring probe 300 is just moved without measuring the object W to be measured, the digital touch signal CP is an output CP3 of the third comparing portion 370C. That is, for the digital touch signals CP, the outputs of the first comparing portion 370A, the second comparing portion 370B, and the third comparing portion 370C are outputted as parallel digital data. Any one of the threshold conditions is set by default in each of the first comparing portion 370A, the second comparing portion 370B, and the third comparing portion 370C. The digital touch signal CP may be transmitted to the main body device 101 by wire via the attachment part 308, or may be transmitted to the main body device 101 by air.

The condition storing portion 368 stores a plurality of other threshold conditions that can replace the threshold conditions set in the comparing portions 370 by default (i.e., the predetermined threshold conditions). For example, when the measuring probe 300 measures the object W to be measured, the condition storing portion 368 stores combinations of four signal levels SL1, SL2, SL3, and SL4 and three durations 0, T0 (≠0), and T1 (≠0, ≠T0) of the signal levels, i.e., a maximum of 12 threshold conditions (the sum of the threshold conditions set in the comparing portions 370 by default (the predetermined threshold conditions) and the other threshold conditions). When the measuring probe 300 is just moved without measuring the object W to be measured, for example, the condition storing portion 368 stores combinations of a single signal level SL5 and three durations 0, T0 (≠0), and T1 (≠0, ≠T0) of the signal level, i.e., a maximum of three threshold conditions (the sum of the threshold condition set in the comparing portion 370 by default (the predetermined threshold condition) and the other threshold conditions). Without being limited thereto, the condition storing portion 368 can store a plurality of threshold conditions. Here, a predetermined threshold condition includes a signal level and a duration of the signal level. As illustrated in FIG. 3, the thresholds set in these first comparing portion 370A, second comparing portion 370B, and third comparing portion 370C can be selected by a rewrite signal SS of the main body device 101. That is, the predetermined threshold conditions of the comparing portions 370 are replaced by the other threshold conditions by the rewrite signal SS outputted from the main body device 101. Note that the threshold conditions of the condition storing portion 368 can be rewritten by the main body device 101.

Each of the comparing portions 370 compares the composite signal Sc, which is an output of the signal synthesizing portion 364, with a threshold condition set by the condition storing portion 368. When the composite signal Sc satisfies the threshold condition, the comparing portion 370 outputs an H level (=1). Otherwise, the comparing portion 370 outputs an L level (=0). That is, when the composite signal Sc satisfies the threshold condition, the digital touch signal CP is continuously at the H level. Without being limited thereto, a pulsed digital touch signal CP may be continually outputted when the composite signal Sc satisfies the threshold condition. Although three comparing portions 370 may be provided as hardware, all of the comparing portions 370 may be configured as software in a single FPGA.

As illustrated in FIG. 3, the main body device 101 represents the entire configuration of the measuring system 100 excluding the measuring probe 300. That is, the main body device 101 is configured to movably support the measuring probe 300 and obtain the shape of the object W to be measured on the basis of the outputs of the signal processing circuit 320. Note that only a part of the main body device 101 associated with the digital touch signals CP is illustrated in FIG. 3.

As illustrated in FIG. 3, the main body device 101 includes a main body processing portion 102. The main body processing portion 102 corresponds to the functions of the motion controller 700 and the host computer 800 illustrated in FIG. 1. The main body processing portion 102 receives the digital touch signals CP and obtains the shape of the object W to be measured when the outputs of the first comparing portion 370A and the second comparing portion 370B satisfy the threshold conditions different from each other. That is, when the digital touch signals CP1 and CP2 shown in FIGS. 4B, 4C, 5B, and 5C are both at the H level, the main body processing portion 102 can obtain the shape of the object W to be measured using a start time of the digital touch signal CP1 as a time at which the contact part 362 just comes into contact with the object W to be measured.

Figure 4A:
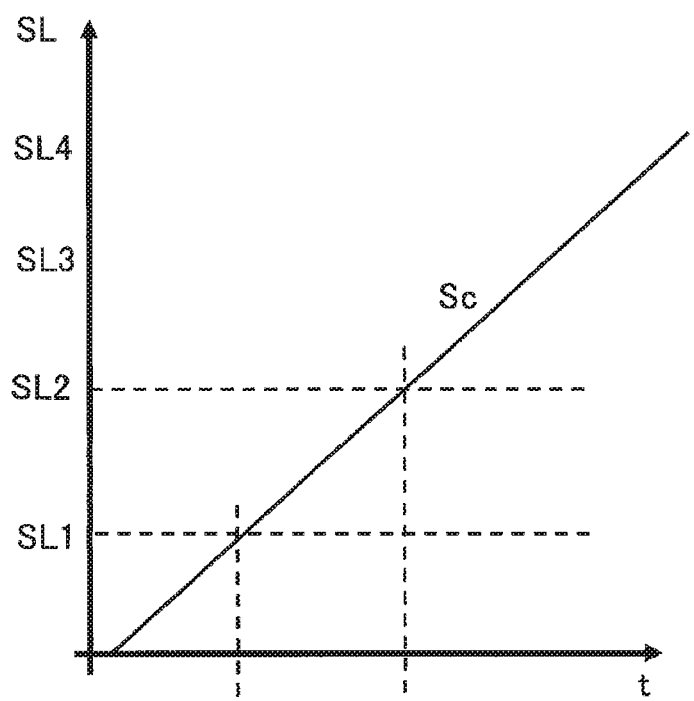
FIG. 4A is a graph showing a relationship between a composite signal inputted to comparing portions of FIG. 3 at the time of measurement and two threshold conditions having different signal levels.
Figure 4B:
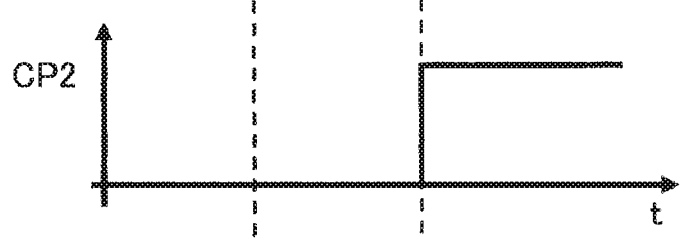
FIG. 4B is a graph showing a digital touch signal obtained in a second comparing portion of FIG. 3.
Figure 4C:
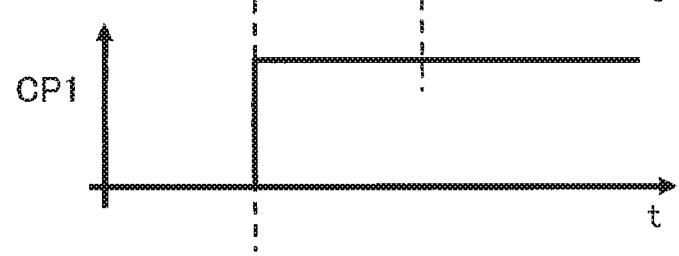
FIG. 4C is a graph showing a digital touch signal obtained in a first comparing portion of FIG. 3.

The operations of the comparing portions 370 when the measuring probe 300 measures the object W to be measured will be described next with reference to FIGS. 4A, 4B, and 4C. In FIG. 4A, the vertical axis represents a signal level SL, and the horizontal axis represents an elapsed time t (the same applies to FIGS. 5A and 6A). For example, it is assumed that the composite signal Sc shown in FIG. 4A is inputted to the comparing portions 370, a threshold condition (the signal level SL1 and the signal level duration (the duration of the signal level) 0) is set in the first comparing portion 370A, and another threshold condition (the signal level SL2 and the signal level duration 0) is set in the second comparing portion 370B. In this case, the first comparing portion 370A outputs the digital touch signal CP1 shown in FIG. 4C, and the second comparing portion 370B outputs the digital touch signal CP2 shown in FIG. 4B. Note that the third comparing portion 370C in the present embodiment is used when the measuring probe 300 is just moved without measuring the object W to be measured. That is, when the measuring probe 300 measures the object W to be measured, the signal outputting portion 366 in this case outputs the digital touch signals CP1 and CP2 using the two threshold conditions having different signal levels SL1 and SL2 and having the same duration of these signal levels (e.g., the duration of the signal levels is 0). In reality, such a case occurs when the signal level SL2 is significantly higher (e.g., severalfold) than the signal level SL1). Unless the signal level SL2 greatly differs from the signal level SL1 (twofold or less), the duration of the signal level SL2 is desirably greater than or equal to 0. That is, when the measuring probe 300 measures the object W to be measured, the signal outputting portion 366 outputs the digital touch signals CP using two of the predetermined threshold conditions in which the signal levels SL1 and SL2 are different from each other and the duration of the signal level SL2 which has a higher level of the signal level is greater than or equal to the duration of the signal level SL1 which has a lower level of the signal level.

Figure 5A:
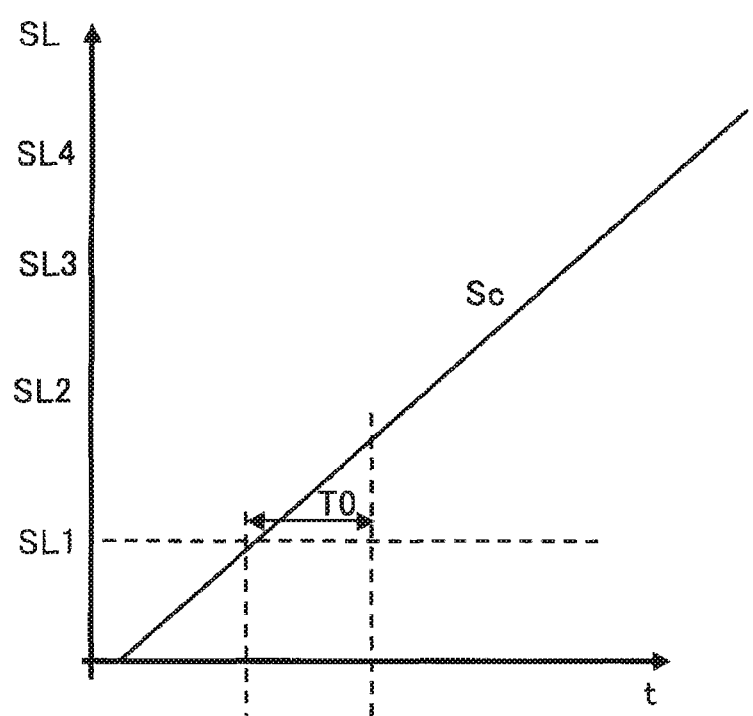
FIG. 5A is a graph showing a relationship between a composite signal inputted to the comparing portions of FIG. 3 at the time of measurement and two threshold conditions having different durations.
Figure 5B:
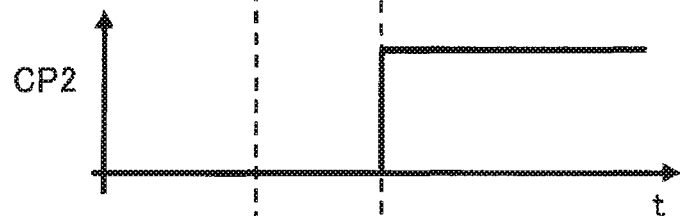
FIG. 5B is a graph showing a digital touch signal obtained in the second comparing portion of FIG. 3.
Figure 5C:
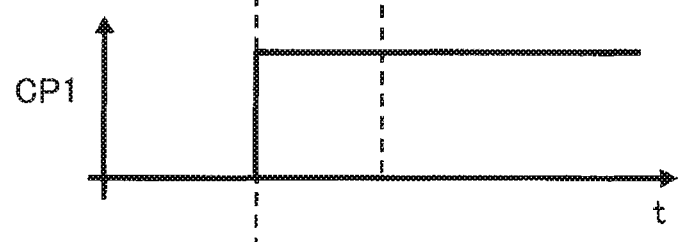
FIG. 5C is a graph showing a digital touch signal obtained in the first comparing portion of FIG. 3.

Alternatively, it is assumed that the composite signal Sc shown in FIG. 5A is inputted to the comparing portions 370, a threshold condition (the signal level SL1 and the signal level duration 0) is set in the first comparing portion 370A, and another threshold condition (the signal level SL1 and the signal level duration T0) is set in the second comparing portion 370B. In this case, the first comparing portion 370A outputs the digital touch signal CP1 shown in FIG. 5C, and the second comparing portion 370B outputs the digital touch signal CP2 shown in FIG. 5B. The digital touch signal CP2 is outputted as a result of the composite signal Sc exceeding the signal level SL1 and lasting for the signal level duration T0 or more. Also in the present embodiment, the third comparing portion 370C is used when the measuring probe 300 is just moved without measuring the object W to be measured. That is, when the measuring probe 300 measures the object W to be measured, the signal outputting portion 366 in this case outputs the digital touch signals CP1 and CP2 using two of the predetermined threshold conditions in which the signal levels are the same (SL1) as each other and the durations of the signal levels are different from each other (0 and T0).

Figure 6A:
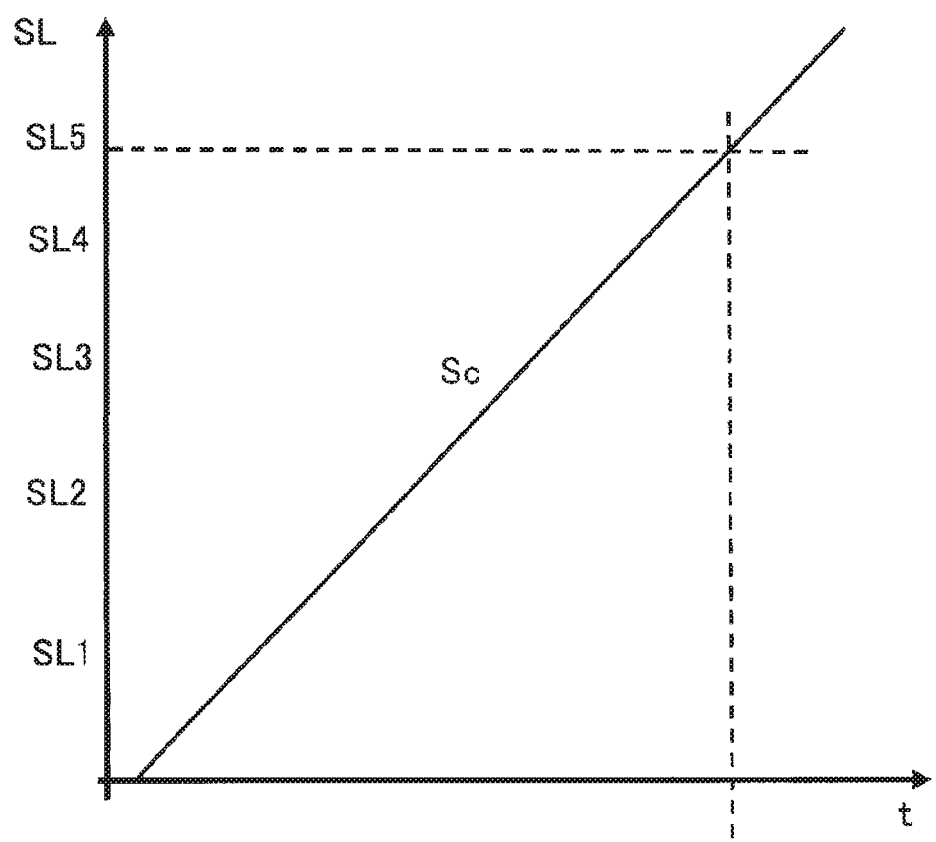
FIG. 6A is a graph showing a relationship between a composite signal inputted to the comparing portions of FIG. 3 at the time of movement and a threshold condition.
Figure 6B:
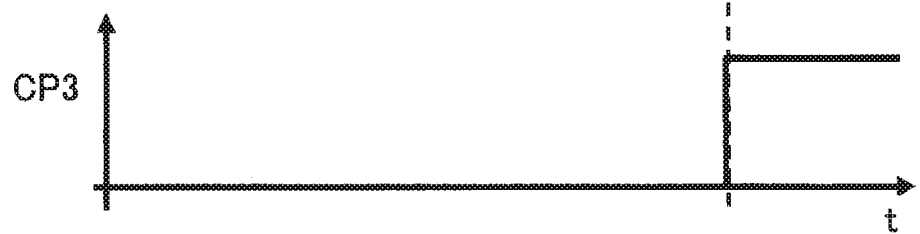
FIG. 6B is a graph showing a digital touch signal obtained in a third comparing portion of FIG. 3.

When the measuring probe 300 is just moved without measuring the object W to be measured, the signal outputting portion 366 is configured to output the digital touch signal using the predetermined threshold condition having the signal level higher than the signal levels used when the measuring probe 300 measures the object W to be measured. For example, it is assumed that the composite signal Sc shown in FIG. 6A is inputted to the comparing portions 370 when the measuring probe 300 is just moved without measuring the object W to be measured, and a threshold condition (the signal level SL5 and the signal level duration 0) is set in the third comparing portion 370C. The third comparing portion 370C then outputs the digital touch signal CP3 shown in FIG. 6B. In this case, the main body processing portion 102 outputs a command to cease the movement of the measuring probe 300 to the drive mechanism 220 rather than obtaining the shape of the object W to be measured.

As described above, the signal processing circuit 320 in the present embodiment includes the signal synthesizing portion 364, and the signal outputting portion 366 configured to output the digital touch signals CP to the main body device 101 when the composite signal Sc satisfies the threshold conditions. The signal outputting portion 366 includes the three comparing portions 370 each configured to compare the composite signal Sc with the threshold conditions. When the measuring probe 300 measures the object W to be measured, the signal outputting portion 366 is configured to output the digital touch signals CP corresponding to the outputs of the first comparing portion 370A and the second comparing portion 370B. That is, the signal outputting portion 366 outputs the digital touch signals CP obtained under different threshold conditions. Since signals outputted from the measuring probe 300 are the digital touch signals CP, the measuring probe 300 has high noise resistance. Moreover, since the digital touch signals CP are those obtained under the different threshold conditions, the accuracy of one of the digital touch signals CP can be verified by the other one of the digital touch signals CP. For example, whether the digital touch signal CP1 obtained under a high-sensitive threshold condition has been obtained as a result of the actual contact of the contact part 362 with the object W to be measured can be determined on the basis of the presence or absence of the digital touch signal CP2 obtained under a low-sensitive threshold condition. Furthermore, measurement accuracy, measurement stability, or measurement variation, for example, can also be estimated on the basis of the occurrence frequencies of those digital touch signals CP.

In the present embodiment, the signal outputting portion 366 includes the condition storing portion 368 configured to store a plurality of other threshold conditions capable of replacing the predetermined threshold conditions set in the comparing portions 370 by default. Thus, to replace the threshold conditions set by default with the other threshold conditions by the rewrite signal SS outputted from the main body device 101, the rewrite signal SS can be a simple signal that merely selects from the other threshold conditions stored in the condition storing portion 368. That is, the rewrite signal SS can be made simpler, and the threshold conditions can be set safely and reliably as compared to when the threshold conditions are externally rewritten in a direct manner. Furthermore, without removing the measuring probe 300, optimum threshold conditions can be selected by the rewrite signal SS while the measuring probe 300 is operated. Without being limited thereto, the threshold conditions can be selected after removing the measuring probe.

In the present embodiment, the digital touch signals CP are outputted as parallel digital data. This can simplify the configuration of the circuit for outputting the digital touch signals CP as compared to when the digital touch signals CP are outputted as serial data. Thus, it is easy to ensure a lighter weight, a lower cost, and stable operations of the measuring probe 300. At the same time, since the digital touch signals CP are outputted as parallel digital data, the response speed of the measuring probe 300 to a measurement can be increased as compared to a case where the digital touch signals CP are outputted as serial digital data.

In the present embodiment, the predetermined threshold condition includes the signal level and the duration of the signal level. Due to such inclusion of a temporal element, the accuracy of the digital touch signal CP can be ensured in a more multifaceted way as compared to a case where a threshold condition is selected on the basis of the signal level only. Without being limited thereto, the threshold condition may include only the signal level or only the duration of the signal level.

When the measuring probe 300 measures the object W to be measured, the signal outputting portion 366 in the present embodiment can output the digital touch signals CP using two of the predetermined threshold conditions in which signal levels are different from each other and the duration of the signal level which has higher level of the signal level is greater than or equal to the duration of the signal level which has lower level of the signal level. Thus, the threshold conditions can be set more appropriately if a difference in the signal levels is a major factor in lowering measurement accuracy or the like.

When the measuring probe 300 measures the object W to be measured, the signal outputting portion 366 in the present embodiment can output the digital touch signals CP using two of the predetermined threshold conditions in which the signal levels are the same as each other and the durations of the signal levels are different from each other. Thus, the threshold conditions can be set more appropriately if a difference in the durations of the signal levels is a major factor in lowering measurement accuracy or the like.

When the measuring probe 300 is just moved without measuring the object W to be measured, the signal outputting portion 366 in the present embodiment outputs the digital touch signal CP using the predetermined threshold condition in which the signal level (the signal level SL5) is higher than those used when the measuring probe 300 measures the object W to be measured. By using such a threshold condition in which the signal level is higher than those used when the measuring probe 300 measures the object W to be measured as just described, the digital touch signal CP is outputted only in a case of an accidental collision, for example, during a movement of the measuring probe 300 without a measuring operation. This allows for a rapid movement of the measuring probe 300, and only the collision of the measuring probe 300 can be reliably detected. In the present embodiment, a plurality of the durations of the signal level can be set in this case. Thus, the digital touch signal CP can be prevented from being outputted erroneously due to disturbance vibrations while the measuring probe 300 is just moved.

Thus, the measuring probe 300 and the measuring system 100 that can stably make measurements with high accuracy while keeping high noise resistance can be obtained according to the present embodiment.

Although the present invention has been described with reference to the first embodiment, the present invention is not limited to the first embodiment. That is, modifications and design changes can be made thereto without departing from the scope of the present invention.

For example, although the digital touch signals CP are outputted as parallel digital data in the first embodiment, the present invention is not limited thereto. The digital touch signals CP may be configured as in a second embodiment illustrated in FIG. 7, for example. The second embodiment differs from the first embodiment in that digital touch signals CP are converted into serial digital data and then outputted. Thus, a description on elements of the second embodiment will be omitted here except for the configuration of a converting portion 472 involved in the conversion of a signal outputting portion 466. Note that their reference numerals in the second embodiment are basically the same as those of the first embodiment except for their first digit. Also in the second embodiment, a measuring probe 400 and a probe unit 401 are identical with each other.

Figure 7:
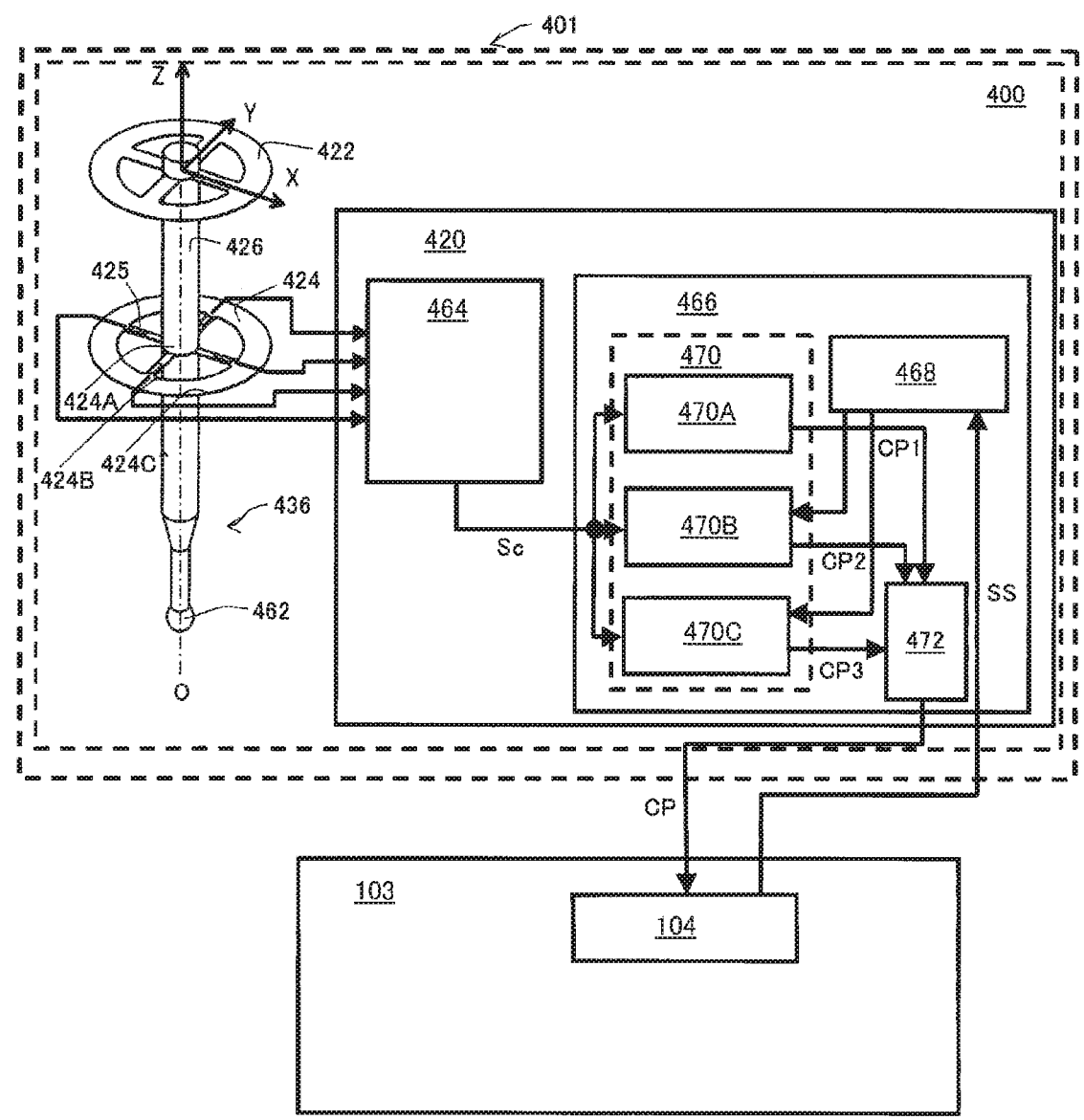
FIG. 7 is a block diagram illustrating a configuration of parts of a measuring probe and a main body device according to a second embodiment of the present invention.

As illustrated in FIG. 7, the signal outputting portion 466 in the second embodiment includes the converting portion 472 as a subsequent stage of comparing portions 470. The converting portion 472 sequentially transmits states (L level and/or H level) of digital touch signals CP1 and CP2 at a given time as a single data unit (serial data) at a constant frequency (e.g., several kHz). When the stylus 436 is not in contact with the object W to be measured, for example, the digital touch signals CP1 and CP2 are both at the L level. During a period before the digital touch signal CP2 is changed to the H level since the start of the contact of the stylus 436 with the object W to be measured, the digital touch signal CP1 at the H level and the digital touch signal CP2 at the L level are transmitted as a single data unit at fixed time intervals. After the digital touch signal CP2 is changed to the H level, the digital touch signal CP1 at the H level and the digital touch signal CP2 at the H level are transmitted as a single data unit at fixed time intervals. Here, if the digital touch signal CP2 is changed to the H level while the digital touch signal CP1 is kept at the H level after the digital touch signal CP1 is changed from the L level to the H level (in a state where a threshold condition in a first comparing portion 470A is being satisfied continuously), those are determined as digital touch signals (trigger signals) produced as a result of the contact of the stylus 436 with the object W to be measured. A main body processing portion 104 can then obtain the shape of the object W to be measured using the time at which the initial digital touch signal CP1 is changed to the H level as a time at which the stylus 436 comes into contact with the object W to be measured.

Since the digital touch signals CP are outputted as serial digital data in the present embodiment, the number of signal lines for the digital touch signals CP can be reduced in the measuring probe 400. This can simplify wiring in the attachment part, in particular.

Although the measuring probe and the probe unit are identical with each other in each of the above-described embodiments, the present invention is not limited thereto. For example, a measuring probe and a probe unit may be configured as those in a third embodiment illustrated in FIG. 8. The third embodiment differs from the above-described embodiments in that a signal outputting portion 566 further includes a probe interface portion 574 connected to a measuring probe 500. That is, a part (the probe interface portion 574) of the signal outputting portion 566 is provided outside the measuring probe 500. A description on elements of the third embodiment will be omitted here except for configurations associated with the probe interface portion 574. Note that their reference numerals in the third embodiment are basically the same as those of the second embodiment except for their first digit.

Figure 8:
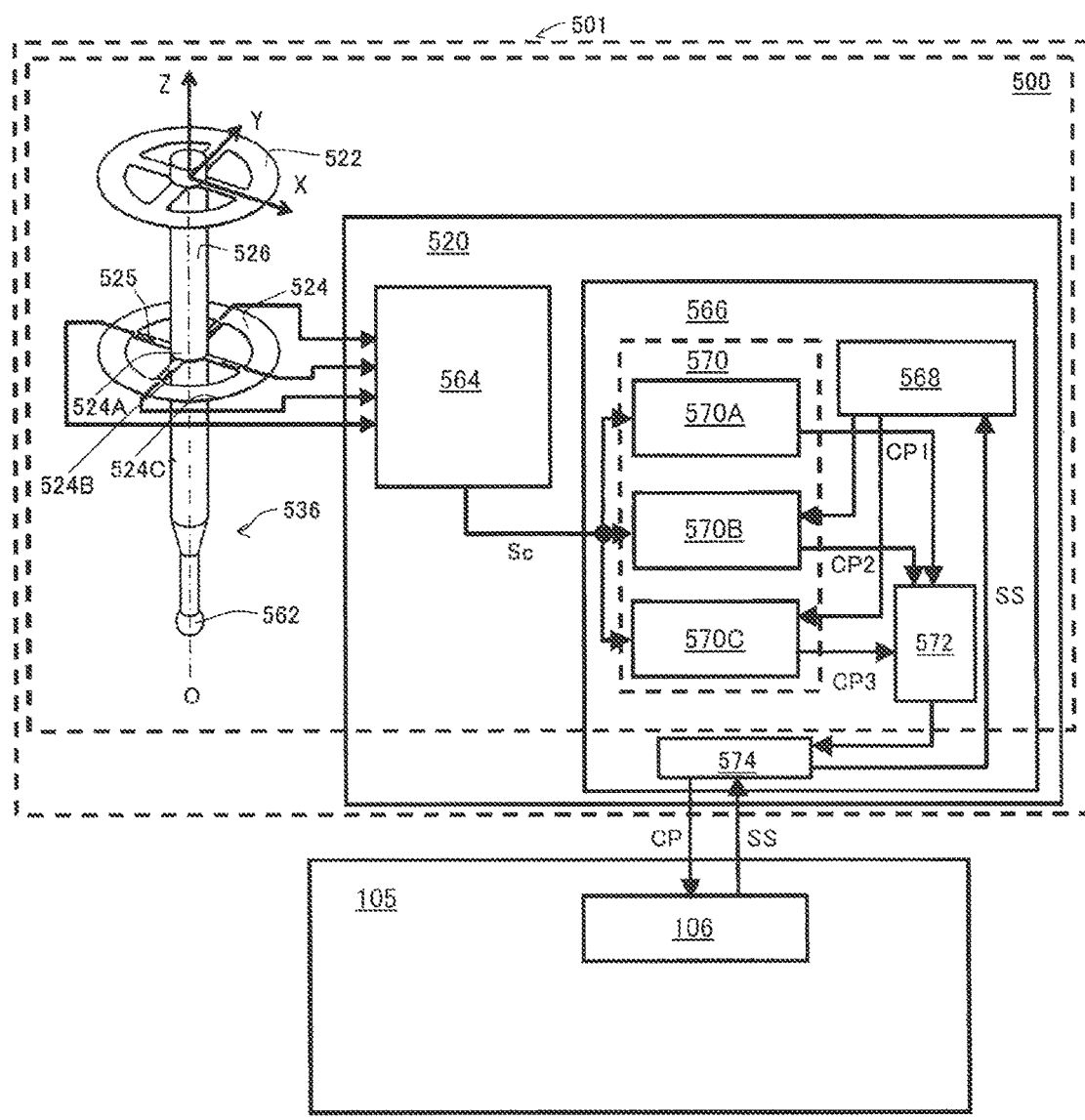
FIG. 8 is a block diagram illustrating a configuration of parts of a measuring probe and a main body device according to a third embodiment of the present invention.

As illustrated in FIG. 8, the probe interface portion 574 of the signal outputting portion 566 is connected to a main body device 105 in the third embodiment. In this case, signal levels of predetermined threshold conditions in a condition storing portion 568 are set in a first comparing portion 570A, a second comparing portion 570B, and a third comparing portion 570C, and the same signal level duration (i.e., 0) is set in the first comparing portion 570A, the second comparing portion 570B, and the third comparing portion 570C. The probe interface portion 574 is connected to the measuring probe 500 to determine if durations of outputs of the first comparing portion 570A, the second comparing portion 570B, and the third comparing portion 570C exceed the signal level durations of the predetermined threshold conditions that would have been otherwise set in the first comparing portion 570A, the second comparing portion 570B, and the third comparing portion 570C, respectively. The probe interface portion 574 is configured to output a digital touch signal CP when the durations of the outputs of the first comparing portion 570A, the second comparing portion 570B, and the third comparing portion 570C exceed those signal level durations of the predetermined threshold conditions.

That is, the probe interface portion 574 in the present embodiment performs processing on the signal level durations that would have been otherwise set in the first comparing portion 570A, the second comparing portion 570B, and the third comparing portion 570C and processed in the first comparing portion 570A, the second comparing portion 570B, and the third comparing portion 570C, respectively. This can simplify processing performed by the measuring probe 500 and can reduce the load of the measuring probe 500. Note that the same signal level may be set in the first comparing portion 570A and the second comparing portion 570B. In this case, threshold conditions set in the first comparing portion 570A and the second comparing portion 570B are the same as each other.

Figure 9:
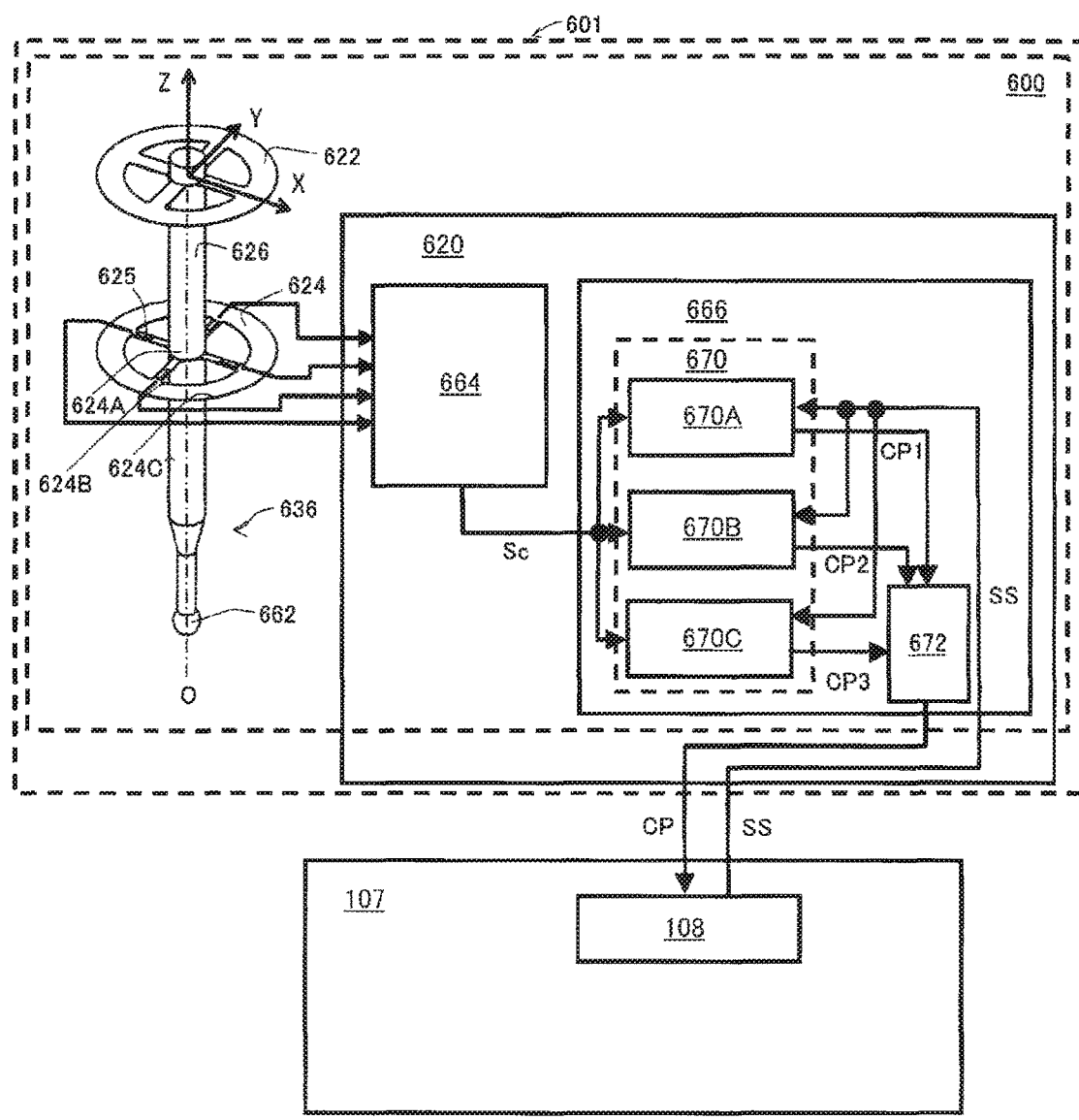
FIG. 9 is a block diagram illustrating a configuration of parts of a measuring probe and a main body device according to a fourth embodiment of the present invention.

Although the probe interface portion 574 in the third embodiment performs the processing on the signal level durations that would have been otherwise processed in the first comparing portion 570A, the second comparing portion 570B, and the third comparing portion 570C, respectively, the present invention is not limited thereto. Such processing may be performed as in a fourth embodiment illustrated in FIG. 9, for example. The fourth embodiment differs from the third embodiment in that a measuring probe 600 and a probe unit 601 are identical with each other. The measuring probe 600 does not include condition storing portion. Thus, a description on elements of the fourth embodiment will be omitted here except for configurations different from those of the third embodiment. Note that their reference numerals in the fourth embodiment are basically the same as those of the third embodiment except for their first digit.

In the fourth embodiment, a main body processing portion 108 performs the processing, which has been performed by the probe interface portion 574 in the third embodiment. That is, the main body processing portion 108 is connected to the measuring probe 600 to determine if durations of outputs of a first comparing portion 670A, a second comparing portion 670B, and a third comparing portion 670C exceed signal level durations of predetermined threshold conditions that would have been otherwise set in the first comparing portion 670A, the second comparing portion 670B, and the third comparing portion 670C, respectively. The main body processing portion 108 configures a digital touch signal CP when the durations of the outputs of the first comparing portion 670A, the second comparing portion 670B, and the third comparing portion 670C exceed those signal level durations of the predetermined threshold conditions. The configured digital touch signal CP is further processed in the main body processing portion 108.

Thus, the present embodiment can simplify processing performed by the measuring probe 600 and can reduce the load of the measuring probe 600 as with the third embodiment. Additionally, the present embodiment does not require probe interface portion. More specifically, a signal processing circuit 620 in the present embodiment includes: a signal synthesizing portion 664; and a signal outputting portion 666 configured to output digital touch signals CP1, CP2, and CP3 to a main body device 107 when a composite signal Sc satisfies parts of the predetermined threshold conditions. The signal outputting portion 666 includes the three comparing portions 670A, 670B, and 670C each configured to compare a part (signal level) of the predetermined threshold condition with the composite signal Sc. When the measuring probe 600 measures the object W to be measured, the signal outputting portion 666 outputs the digital touch signals CP1 and CP2 corresponding to the outputs of the first comparing portion 670A and the second comparing portion 670B. Each of the predetermined threshold condition includes the signal level and the duration of the signal level. The signal level of each of the predetermined threshold conditions is applied in the first comparing portion 670A and the second comparing portion 670B, and the durations of the signal levels are the same (e.g., 0). It can be said that the main body device 107 is configured to apply the signal level durations of the predetermined threshold conditions to the digital touch signals CP1 and CP2 upon the reception of the digital touch signals CP1 and CP2 and obtain the shape of the object W to be measured when the outputs of the first comparing portion 670A and the second comparing portion 670B satisfy the predetermined threshold conditions.

Note that the measuring probe 600 in the present embodiment does not include condition storing portion. More specifically, the thresholds conditions in the comparing portions 670 are directly rewritten by a rewrite signal SS. The rewrite signal SS in this case may be a signal representing a threshold condition prestored outside the measuring probe 600, or a signal of a threshold condition created on the spot.

Although the three comparing portions are provided in the above-described embodiments, the present invention is not limited thereto. It is only necessary that two or more comparing portions be provided. For example, four or more comparing portions may be provided. For example, a plurality of comparing portions corresponding to the number of conceivable predetermined threshold conditions that is greater than the number of actually-used comparing portions may be provided, and all of their digital touch signals may be inputted to the main body processing portion. In this case, the main body processing portion may be configured to be able to select which outputs of the comparing portions are to be processed. Such a configuration can eliminate the need for the rewrite signal from the main body processing portion, and can simplify control inside the measuring probe.

The present invention can be widely applied to probe units and measuring systems that are used for measuring three-dimensional shapes of objects to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A probe unit comprising a measuring probe including: a stylus having a contact part to be in contact with an object to be measured; a detection element configured to be capable of detecting a movement of the contact part; and at least part of a signal processing circuit configured to process an output of the detection element to output a digital touch signal, wherein:

the signal processing circuit
processes the output of the detection element to output a composite signal obtained by synthesizing displacement components of the contact part in three directions perpendicular to one another, and
outputs the digital touch signal to the outside of the probe unit when the composite signal satisfies a predetermined threshold condition;
the signal processing circuit includes a plurality of comparators each configured to compare at least a part of the predetermined threshold condition with the composite signal; and
when the measuring probe measures the object to be measured, the signal processing circuit outputs the digital touch signal corresponding to outputs of two or more comparators of the plurality of comparators.

2. The probe unit according to claim 1, wherein the signal processing circuit stores a plurality of other threshold conditions capable of replacing the predetermined threshold condition set in the comparing portion by default.

3. The probe unit according to claim 1, wherein the digital touch signal is outputted as parallel digital data.

4. The probe unit according to claim 1, wherein the digital touch signal is outputted as serial digital data.

5. The probe unit according to claim 1, wherein the predetermined threshold condition includes a signal level and a duration of the signal level.

6. The probe unit according to claim 5, wherein:
the signal level of the predetermined threshold condition is set in each of the two or more comparators;
the durations of the signal levels are set to be the same as each other in the two or more comparators; and the signal processing circuit further determines if durations of the outputs of the two or more comparators exceed the durations of the signal levels of the predetermined threshold conditions, respectively, and to output the digital touch signal when the durations of the outputs of the two or more comparators exceed the durations of the signal levels of the predetermined threshold conditions.

7. The probe unit according to claim 5, wherein, when the measuring probe measures the object to be measured, the signal processing circuit outputs the digital touch signal using two of the predetermined threshold conditions in which the signal levels are different from each other and the duration of a signal level which has a higher level of the signal level is greater than or equal to the duration of the signal level which has a lower level of the signal level.

8. The probe unit according to claim 5, wherein, when the measuring probe measures the object to be measured, the signal processing circuit outputs the digital touch signal using two of the predetermined threshold conditions in which the signal levels are the same as each other and the durations of the signal levels are different from each other.

9. The probe unit according to claim 7, wherein, when the measuring probe is just moved without measuring the object to be measured, the signal the signal processing circuit outputs the digital touch signal using the predetermined threshold condition having the signal level higher than the signal levels used when the measuring probe measures the object to be measured.

10. A measuring system comprising:
a measuring probe including a stylus having a contact part to be in contact with an object to be measured, a detection element configured to be capable of detecting a movement of the contact part, and a signal processing circuit configured to process an output of the detection element to output a digital touch signal; and
a main body device configured to movably support the measuring probe and obtain a shape of the object to be measured on a basis of an output of the signal processing circuit, wherein:
the signal processing circuit
  processes the output of the detection element to output a composite signal obtained by synthesizing displacement components of the contact part in three directions perpendicular to one another, and
  outputs the digital touch signal to the main body device when the composite signal satisfies a predetermined threshold condition;
the signal processing circuit includes a plurality of comparators each configured to compare the predetermined threshold condition with the composite signal;
when the measuring probe measures the object to be measured, the signal the signal processing circuit outputs the digital touch signal corresponding to outputs of two or more comparators of the plurality of comparators; and
the main body device receives the digital touch signal and obtains the shape of the object to be measured when the outputs of the two or more comparators satisfy the predetermined threshold condition.

11. A measuring system comprising:
a measuring probe including a stylus having a contact part to be in contact with an object to be measured, a detection element configured to be capable of detecting a movement of the contact part, and a signal processing circuit configured to process an output of the detection element to output a digital touch signal; and
a main body device configured to movably support the measuring probe and obtain a shape of the object to be measured on a basis of an output of the signal processing circuit, wherein:
the signal processing circuit
  processes the output of the detection element to output a composite signal obtained by synthesizing displacement components of the contact part in three directions perpendicular to one another, and
  outputs the digital touch signal to the main body device when the composite signal satisfies a part of a predetermined threshold condition;
the signal processing circuit includes a plurality of comparators each configured to compare the part of the predetermined threshold condition with the composite signal;
when the measuring probe measures the object to be measured, the signal processing circuit outputs the digital touch signal corresponding to outputs of two or more comparators of the plurality of comparators;
the predetermined threshold condition includes a signal level and a duration of the signal level;
the signal level of the predetermined threshold condition is applied in the comparators, and the duration of the signal level is the same in all of the comparators; and
the main body device applies the duration of the signal level of the predetermined threshold condition to the digital touch signal upon reception of the digital touch signal, and obtains the shape of the object to be measured when the outputs of the two or more comparators satisfy the predetermined threshold condition.

12. The measuring system according to claim 10, wherein the predetermined threshold condition is replaced by another threshold condition by a rewrite signal outputted from the main body device.

* * * * *